United States Patent
Mashida

[11] 3,962,013
[45] June 8, 1976

[54] METHOD OF FORMING A BEARING HOLE IN THE BODY OF A STRAP MEMBER MAINLY ADAPTED FOR USE AS A WATCH STRAP

[75] Inventor: Toru Mashida, Tokyo, Japan
[73] Assignee: NCO Works, Ltd., Tokyo, Japan
[22] Filed: Mar. 10, 1975
[21] Appl. No.: 556,835

[30] Foreign Application Priority Data
Sept. 4, 1974 Japan................................ 49-102340
Oct. 17, 1974 Japan................................ 49-120176

[52] U.S. Cl.................................. 156/215; 156/273; 156/304; 264/26; 264/249; 264/263
[51] Int. Cl.²..................... B29C 19/04; B29H 5/26
[58] Field of Search............ 156/273, 176, 304, 213, 156/, 215; 264/26, 263, 265, 271, 274, 25, 248, 249, 275, 277, 313

[56] References Cited
UNITED STATES PATENTS
2,519,330  8/1950  Evans et al. ........................ 156/253
2,886,481  5/1959  Swan.................................. 264/249

Primary Examiner—Douglas J. Drummond
Attorney, Agent, or Firm—William A. Drucker

[57] ABSTRACT

There are provided improvements in the formation of a bearing hole in the body of a strap member made of a thermoplastic resin and particularly adapted for use as a watch strap, said bearing hole being intended to receive therethrough a spring rod or the like for mounting said strap member onto a watch case or the like.

Firstly, the improvements are directed to a method of forming a bearing hole in one end of the body of said strap member which comprises having said end of said body contacted by a tubular member having a central axis thereof penetrated by a core member of a material having a small dielectric loss and being of a nature not to be fused with said strap member body even when heated, and then integrally heat uniting together said strap member and tubular member by means of a high frequency adhesion device in a silicone rubber press mold to form a bearing hole at a right position in the body of said strap member.

Secondly, the improvements involve a method of forming a bearing hole in a more effective manner by employment of a core member such as rod-like one of which at least the surface portions are composed of a material which is so excellent in lubricity and heat resistance as to be easily released from the press mold, thereby enabling the core rod to be easily removed from the strap body by pulling.

14 Claims, 7 Drawing Figures

(A)    (B)

METHOD OF FORMING A BEARING HOLE IN THE BODY OF A STRAP MEMBER MAINLY ADAPTED FOR USE AS A WATCH STRAP

BRIEF SUMMARY OF THE INVENTION

This invention relates to a method of forming a bearing hole transversely in one end of a synthetic resin made watch strap or the like, adapted to receive therethrough a spring rod or the like for mounting said strap onto the casing of a wrist watch or the like.

High quality watch straps or the like straps made of natural leather have been highly esteemed by people for their unique and elaborate appearances. For a long time there have been made studies of how to produce inexpensive artificial strap products which closely resemble those natural leather-made straps, having appearances characteristic of natural leather, but those products which have thus far been developed still have appearances far different from those possessed by said natural ones, and can be distinguished from the natural ones at first glance. Typical examples of such artificial straps include ones made of rubber which have been molded in a mold with inner walls engraved with a pattern, and ones made of synthetic resin obtained by injection molding using the same mold as above. However, as well known, the engraving in itself has limited elaboration and delicacy, and the resultant products can never be expected to have feeling or appearances closely resembling those of high quality natural leather products. Further, since the products are molded from a single sort of material, they are far different from natural leather in touch, tensile deformation, and flexibility. Still further, in the molding of powdery material in a mold, the resultant product has fins protruded from peripheral edges thereof, as is often the case with the rubber molding, which requires complicated aftertreatment to remove those fins after the molding. Also the resultant products are far inferior to natural ones of high quality in respect of appearance, feeling, flexibility, mechanical strength, etc.

In view of these shortcomings of the conventional methods, the present inventors developed a series of methods of manufacturing synthetic resin-made strap members particularly adapted for use with wrist watches and having laminated structures with surfaces thereof exactly resembling the surface patterns characteristic of high quality natural leather watch straps, and having feeling and touch closely simulating that of the latter when put on the wrist.

A typical example of these methods comprises steps of: preparing a laminated sheet constituted by a top surface layer of a thermoplastic synthetic resin sheet, a back surface layer of a thermoplastic synthetic resin sheet or an artificial leather, and an intermediate layer of an expansible material such as a synthetic resin sponge sheet, a synthetic resin sheet containing a virgin foaming or frother agent, or a thermoplastic resin powder or granules, (, and a reinforcing material, if necessary); heat sealing by a high-frequency adhesion device peripheries of portions of the laminated sheet to be formed as strap bodies; immediately then punching the strap body portions of a desired shape thus to obtain half-finished products; then putting the half-finished products one by one into a silicone rubber press mold having an inner wall or inner walls thereof embossed with patterns of natural leather product of high quality; and heating under prossure the press mold to cause said expansible material to expand so that the top surface layer and back surface layer of the half-finished product are pressed against the inner walls of the press mold so as to have the surfaces of said layers embossed closely with said patterns, thus to obtain a strap member for use as watch strap or the like. However, in utilizing these methods, there has been a problem in forming a bearing hole in an end of the strap member through which a spring rod or the like is to be inserted, for attaching the strap member on a watch case or the like. That is, in preparing a half-finished product, as shown in FIG. 1, a core rod 3 is previously inserted through a portion at which the bearing hole is to be formed, and then the peripheral portions of each strap body of the laminate are stuck together and punched or cut out. In this case, the inserted core rod 3 locally keeps its surrounding portion of the strap body from being stuck together so as to form a bearing hole 4. But, according to such method, in the final step of heating under pressure the half-finished product in the silicone rubber press mold for embossment, there may occur deformation or agglutination of a portion of the strap member surrounding the core rod according to the material of the core rod thus making it very difficult to remove the core from the resultant product. This phenomenon frequently occurs particularly when the embossing is effected solely by the external pressure rather than with the aid of internal expansion of the expansible material. Besides this, the bearing hole is formed at a wrong position, resulting in the impossibility of mounting the strap member onto a watch case, injury to the appearance, and deterioration in mechanical strength. There has been employed another method, as shown in FIG. 2, in which one end of the top surface layer 5 is turned back to overlap a corresponding end of the back surface layer 6 to form a hollow tubular portion, and a resin rod 3 is inserted through said tubular portion, followed by heat sealing the peripheral portions of the intened strap body portions, and cutting out the same. Also this method requires much time and has the same disadvantage as the first-mentioned method: Particularly in the case of a reinforcing material (e.g. non-woven fabric cloth) being incorporated in the laminate in contact with the resin rod 3, the rod is caught by said cloth to become difficult to pull out of the strap member which may cause hindrance in the formation of the bearing hole.

The present invention has been devised in order to eliminate these shortcomings, and it is a primary object of the invention to provide a method of forming a bearing hole in the body of a thermoplastic synthetic resin strap member, including steps of: bringingg a tubular member with a rod-like core member axially penetrating through a central axis thereof, into side-by-side contact with one end of the body of said strap member, said core member being made of a material of a small dielectric loss which can be decomposed to adhere to the body of said strap member when heated; and integrally heat uniting together the strap element and tubular member within a silicone rubber press mold, by means of a high-frequency adhesion device, thereby to form at a proper position in the strap member a bearing hole which is free of dislocation or deformation.

Another object of the invention is to provide a method of forming a bearing hole which facilitates pulling the core member out of the strap element by employment of a core member of which at least the surface portion is composed of a material which is so excellent in lubricity and heat resistance as to be readily released from a mold, thereby enabling the core member to be easily pulled out.

The above and other related objects and features of the invention will be apparent from a reading of the following decription of the disclosure found in the accompanying drawings and the novelty thereof pointed out in the appended claims.

DETAILED DESCRIPTION OF THE INVENTION

Figure 3:
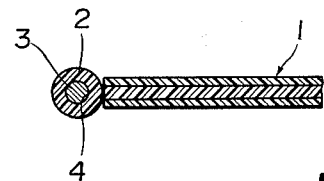
FIG. 3 is a schematic sectional view showing a first embodiment according to the invention.

Referring first to FIG. 3, a fundamental embodiment according to the invention will hereunder be described. Reference numeral 1 designates a strap member made of a thermoplastic synthetic resin such as polyurethane, and 2 represents a tubular member also made of a thermoplastic synthetic resin such as polyurethane, and being penetrated, along a central axis thereof, by a core rod 3 made of a resinous material which is low in dielectric loss. This tubular member 2 is brought into side-by-side contact with one end of the strap member 1 together with said core rod 3 axially centrally penetrating the tubular member 2, and usually is inserted into a silicone rubber press mold of a closable type, followed by being subjected to high-frequency adhesion so that the tubular member 2 becomes fused with said end of the strap member 1. After the molding is finished, the core rod 3 is brought into a state for removal from the strap member 1 by pulling, thereby to form a bearing hole 4 in the strap member 1. Prior to inserting the strap member 1 and tubular member 2 into the mold, the tubular member 2 may be temporarily stuck to the end of the strap member 1 in side-by-side contact via a solvent or a hot glue or by thermally merging together adjoining portions of the tubular member and strap member. Usually, the strap member 1 is of a laminated structure, but may be of another structure. In the case of a laminated structure, usually the tubular member 2 is subjected to said thermal merging with the strap member 1 just after said temporary adhesion and punching of the strap member along the periphery thereof, thereby to form a half-finished product. But, this is not limitative.

The suitable material for the core member is required to be a resin or the like having a dielectric constant ranging from 1.2 to 6 in the value of $\epsilon$ and $0.7 \times 10^{-4}$ to $380 \times 10^{-4}$ in the value of $\tan\delta$, measured at ambient temperature and at frequencies of $10^6$ to $10^7$, so that it is unlikely to become fused with said tubular member, when heated.

If the tubular memeber 2 is made of a thermoplastic resin expansible material with a high dielectric loss, the outer portions of the tubular member expanded by heating the silicone rubber press mold are pressed against the inner walls of the press mold to be embossed with the patterns more effectively. When made of an expansible material, the diameter of the tubular member has only to be at least as small as the thickness of the strap member. Whilst, the tubular memberr which is made of a non-expansible material is required to have a larger diameter as compared with the thickness of the strap member, so as to realize effective embossing. The material suitable for the tubular member usually includes a sponge sheet of a thermoplastic resin such as polyurethane, and a thermoplastic resin sheet such as polyurethane sheet containing a virgin foaming agent.

Figure 4:
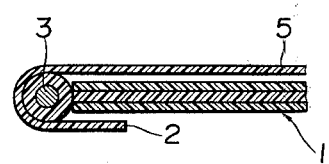
FIG. 4 is a schematic sectional view showing another embodiment of the invention.

FIG. 4 shows another embodiment of the invention in which an end of the top surface layer 5 of a thermoplastic resin sheet is turned around the tubular member 2 to overlap a corresponding end of the back surface of the strap member 1. In this embodiment are used a tubular member 2 of the same structure, and the same heating merging process as in the preceding embodiment.

Figure 5:
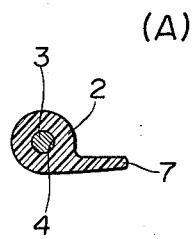
FIG. 5 (A), (B) are schematic sectional views showing modified examples of the tubular member adapted for use in said embodiments.
Figure 5:
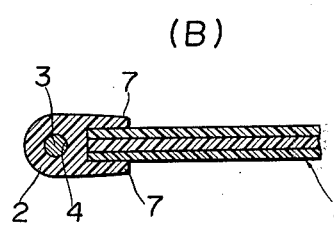

FIG. 5 (A) and (B) show modified types of the tubular member which each is provided with at least one ridge-like protrusion on one side thereof to tangentially extend along the whole length thereof for enhancing the effect of joining the tubular member 2 to the strap member body 1. Between the protrusion and an associated adjacent side portion of the tube 2 is inserted one end of the body of the strap member 1 into contact with said tube. Thus, the cross section of the tubular member 2 of the invention may be of any desired shape in cross section.

The present invention is such as mentioned above, according to which a bearing hole with high mechanical strength and of a proper size and shape can be precisely formed at a right position by means of a tubular member irrespective of the thickness of the top or back surface layer of the strap member or the material thereof. Furthermore, unlike the conventional method in which the core is inserted directly between the top and back surface layers, the operator need not worry about how to insert the core rod into a right position and maintain it in said position as it is. Therefore, the invention may produce various effects, e.g., the half-finished products may be manufactured on a mass production basis with easiness and the resultant final products may have bearing holes being uniform in quality and size and shape.

Further, the present inventors have drawn a conclusion from actual experimentation and study that the following materials may be advantageously used for the core member for facilitation of removal of the core member from the bearing hole formed in the final step: The phenomena such as deformation or agglutination of the portion of the strap member surrounding the hole in removal of the core depend upon the material of the core. As previously stated, the material for the core rod needs to have a low dielectric loss. For instance, the materials which fulfill said requirement include resins such as polytetrafluoroethylene, silicone resin, polypropylene, polyethylene, glass, wood, and ceramic.

Figure 1:
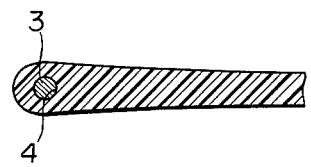
FIGS. 1 and 2 are schematic sectional views showing parts of the strap members at which bearing holes are to be formed, according to conventional methods.
Figure 2:
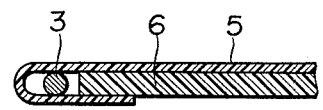
Figure 6:
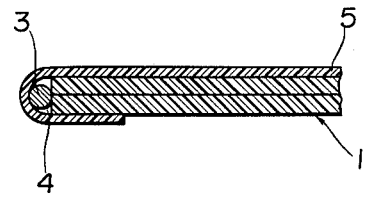
FIG. 6 is a schematic sectional view showing a still further embodiment according to the invention.

However, particularly advantageous materials are those excellent in heat resistance and releasability from the tubular member surrounding the core (hereinafter called "mold releasability"), which can completely ensure ready removal of the core from the tubular member without the aforestated deformation or agglutination of the surrounding portion after heating under pressure the strap member and tubular member with a core rod inserted therethrough. The suitable materials which satisfy these requirements may be resins such as polytetrafluoroethylene, and silicone resin. The experiments and studies met with a result that the other materials, for instance, polyethylene resin (inferior in heat resistance), glass, wood, and ceramic (inferior in mold releasability) may advantageously be coated, at surfaces thereof, with a mold releasing agent which is low in dielectric loss and excellent in mold releasability, such as silicone oil and Japan wax, so that the ideal effect may be obtained. Besides the above-mentioned mold releasing agents, paraffin, stearin wax, grease, mineral oil, vegitable oil, animal oil, and lecithin may be suitable for such mold releasing agent. The synthetic resins suitable for use with these mold releasing agents include polyethylene, polypropylene, polyacetal, polycarbonate, polyethyleneterephthalate, polystyrene, methacrylate, ethylene trifluoride, etc. The core of which at least the surface portions are made of a material which is so excellent in heat resistance and mold releasability as not to be fused with the body of the strap member, particulary its top surface layer, may be used not only in the bearing hole forming methods of FIG. 3 to FIG. 5(A), (B), but also in the conventional methods, particularly, such as one shown in FIG. 2. In the bearing hole formation of FIG. 2, as shown in FIG. 6 one end of the top surface layer 5 of the strap member is turned back to overlap a corresponding end of the back surface layer 6 to provide a hollow tubular portion, in which portion is then directly inserted a core rod 3 (without insertion of a tubular member) to be followed by heating under pressure the core rod and strap member in a silicone rubber press mold to obtain a molded product. Further, in this case, if the top surface layer 5 is made of a sponge-like sheet of an expansible thermoplastic resin material or a sheet of an expansible thermoplastic resin material containing a virgin foaming agent, said layer 5 is adequately expanded by heating under pressure within a silicone rubber press mold to be effectively embossed with the pattern of the press mold.

Thus, by virtue of the above-stated improvements, removal of the core rod from the strap member can be effected with far more easiness, and a through bearing hole can be formed without deformation or damage which has exactly a desired size and shape, thus producing remarkable operational effects in the manufacture of strap members.

It is presumed that such effects are due to the fact that the material for the core is specifically selected and a mold releasing agent is coated over the surface of the core so that the relationship between the core and the strap member and/or the tubular member in contact therewith is improved, and further when they are heated under pressure in a silicon rubber press mold for embossment, pressure is uniformly imparted to the core in the direction of the central axis thereof to avoid deformation of the core and intrusion of the non-woven fabric cloth into the core.

While the descirbed embodiments represent the preferred forms of the present invention, it is to be understood that modifications will occur to those skilled in the art without departing from the spirit of the invention. The scope of the invention is therefore to be determined solely by the appended claims.

What is claim is:

1. In the manufacture of a strap member comprising a body which includes at least one layer substantially composed of a thermoplastic resin and particularly suitable for use as watch strap, a method of forming a bearing hole in one end of said strap member for attaching said strap member onto a watch case or the like, comprising steps of:
    a. preparing a tubular member of a thermoplastic resin with a central axis thereof penetrated by a core member of a material having a small dielectric loss and being of a nature not to be fused with the body of said strap member when heated;
    b. placing said tubular member and strap member into a mold in such a fashion that the tubular member is in side-by-side contact with one end of the body of said strap member;
    c. subjecting said tubular member and strap member to high-frequency adhesion so that the tubular member becomes fused with said end of said strap member body; and
    d. removing said core member therefrom to form a bearing member therein.

2. The method of forming a bearing hole as claimed in claim 1, further comprising between said steps (a) and (b) a step of temporarily sticking said tubular member to said end of the body of said strap member in side-by-side contact.

3. The method of forming a bearing hole as claimed in claim 1, wherein in said step (b) a thermoplastic resin sheet is disposed over the body of said strap member and tubular member in such a fashion as to have one end thereof turned around said tubular member to overlap a corresponding end of the back surface of said strap member, to serve as a top surface layer.

4. The method of forming a bearing hole as claimed in claim 1, wherein said tubular member is provided with one ridge-like protrusion on one side thereof to tangetially extend along the whole length thereof for inserting into contact therewith one end of said strap member between said protrusion and an associated adjacent side portion of said tubular member.

5. The method of forming a bearing hole as claimed in claim 1, wherein said tubular member is provided with two ridge-like protrusions on one side thereof to extend in the same tangential direction along the whole length thereof for inserting into contact therewith one end of said strap member between said protrusions and an associated adjacent side portion of said tubular member.

6. The method of forming a bearing hole as claimed in claim 1, wherein said core member has at least the surface portions thereof made of a material selected from the group consisting of synthetic resin, glass, wood, and ceramic.

7. The method of forming a bearing hole as claimed in claim 6, wherein said synthetic resin is any one selected from the group consisting of silicone resin, polyethylene, polytetrafluoroethylene, polypropylene, polyacetal, polycarbonate, polyethyleneterephthalate, polystyrene methacrylate, and ethylene trifluoride.

8. The method of forming a bearing hole as claimed in claim 6, wherein said step (a) said core member is coated, at surfaces thereof, with a mold releasing agent which is low in dielectric loss and excellent in mold releasability and composed of a material selected from the group consisting of silicone oil, Japan wax, paraffin, stearin wax, grease, mineral oil, vegetable oil, animal oil, and lecithin.

9. The method of forming a bearing hole as claimed in claim 1, wherein said tubular member is made of an expansible thermoplastic resin material.

10. In the manufacture of a strap member comprising a body which includes at least one layer substantially composed of a thermoplastic resin and suitable particularly for use as a watch strap, a method of forming a bearing hole in one end of said strap member for attaching said strap member onto a watch case or the like, comprising steps of:
   a. inserting a core member having at least surface portions thereof made of a material so excellent in mold releasability and low in dielectric loss as not to be fused with said body of the strap member when heated, into a given portion of said body of the strap member at which the bearing hole is to be formed;
   b. placing said strap member thus incorporated with said core member into a mold and heating under pressure said press mold for embossing said strap member; and
   c. removing said core member therefrom to form a bearing hole therein.

11. The method of forming a bearing hole as claimed in claim 10, wherein said core member is made of a material which is so low in dielectric loss as not to be fused with the body of said strap member when heated, and further coated, at surfaces thereof, with a mold releasing agent of a low dielectric loss.

12. In the manufacture of a strap member comprising a body substantially composed of a thermoplastic resin, and suitable particularly for use as a watch strap, a method of forming a bearing hole in one end of said strap member for attaching said strap member onto a watch case or the like, comprising steps of:
   a. preparing said body of the strap member having a top surface layer of an expansible thermoplastic resin material in which one end of said top surface layer is turned back to overlap a corresponding end of the back surface of said body to form a hollow tubular portion;
   b. inserting a core member made of a material which is so low in dielectric loss as not to be fused with the body of said strap member and said top surface layer when heated, into said hollow tubular portion;
   c. placing said strap member thus incorporated with said core member into a mold;
   d. subjecting said strap member to high frequency adhesion for heat uniting said strap member and core member together; and
   e. removing said core member from said strap member to form a bearing hole in said hollow tubular portion.

13. The method of forming a bearing hole as claimed in claim 11, wherein said expansible thermoplastic resin for said top surface layer is a synthetic resin sheet of a sponge-like structure.

14. The method of forming a bearing hole as claimed in claim 11, wherein said expansible thermoplastic resin for said top surface layer is a synthetic resin sheet containing a virgin forming agent.

* * * * *